April 17, 1951  M. L. PARKER  2,549,332

MICROMETER ADJUSTMENT FOR LATHE STOPS

Filed Feb. 5, 1947

*Inventor*

Marvin L. Parker

By *Clarence A. O'Brien and Harvey B. Jacobson*
Attorneys

Patented Apr. 17, 1951

2,549,332

UNITED STATES PATENT OFFICE 2,549,332

MICROMETER ADJUSTMENT FOR LATHE STOPS

Marvin L. Parker, Detroit, Mich.

Application February 5, 1947, Serial No. 726,452

3 Claims. (Cl. 116—133)

The present invention relates to new and useful improvements in lathe stops and other devices embodying a screw threaded adjustment and more particularly a micrometer reading to accurately determine the extent of the adjustment of turret lathe stops.

In the present type of lathe stops the adjustment of the stop by threading the stop in or out is more or less a matter of guess or necessitates the use of a feeler gauge or other tool to determine the extent of adjustment of the stop necessary and it is accordingly an object of the present invention to improve the accuracy in determining the adjustment of a screw threaded lathe stop for turret lathes and the like by providing a micrometer reading mounted directly on the outer end of the stop to determine the extent of adjustment thereof by the degree of rotation of the screw.

A further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
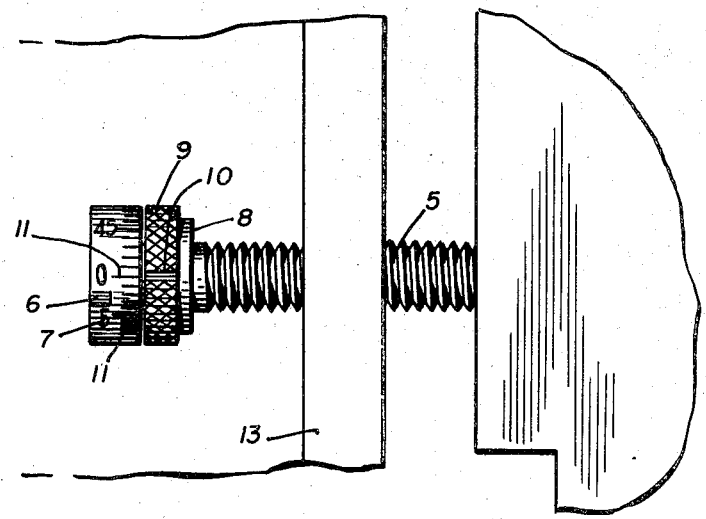
Figure 1 is a side elevational view showing a turret lathe stop constructed in accordance with the present invention.
Figure 2:
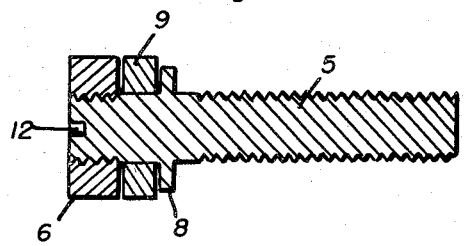
Figure 2 is a longitudinal sectional view thereof.
Figure 3:
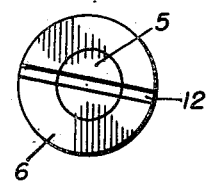
Figure 3 is an end elevational view.

Referring now to the drawing in detail, wherein for the purpose of illustration I have disclosed a preferred embodiment of the invention, the numeral 5 designates a screw threaded member constructed with the threads of a predetermined pitch and adapted for use as a turret lathe stop.

To the outer end of the screw is suitably secured a head 6 by threaded engagement with the screw or otherwise suitably attaching the head thereto, the head being of annular construction and marked on its periphery with graduations 7.

Spaced inwardly from the head the screw is formed with a flange 8, the portion of the screw between the head 6 and flange 8 being smooth for freely mounting thereon a knurled ring 9. The periphery of the ring is provided with a mark 10 adapted to be held in alignment with the zero marking 11 or other portion of the scale 7 carried by the head 6.

The end of the screw 5 as well as the head 6 is formed with a kerf 12 adapted for receiving a screw driver or other tool to turn the screw to effect an adjustment thereof.

In the operation of the device a screw 5 is mounted in a suitable part of a turret lathe 13 to function as a lathe stop and when it is desired to adjust the stop the free turning ring 9 is held by the fingers of the operator with the marking 10 of the ring in alignment with the zero marking 11 of the head 6 and the head rotated predetermined number of degrees in a proper direction in accordance with the desired adjustment to be made in the stop.

By reason of this construction an accurate adjustment of the stop is possible.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. An indicator for a screw threaded lathe stop to gauge the adjustment thereof comprising an annular head fixed to the outer end of the lathe stop and having a scale on the periphery thereof, and a free turning ring carried on the outer end of the lathe stop immediately adjacent to said head, said ring including a fixed setting for registry with said scale and adapted to be manually held stationary while threaded adjustment of the lathe stop is made.

2. An indicator for micrometer adjustment of a screw threaded lathe stop comprising an annular-shaped member fixed to the outer end of the lathe stop, a rotatably mounted ring-shaped member carried on the outer end of the lathe stop immediately adjacent to said fixed member, one of said members having a scale on the periphery thereof extending substantially completely therearound and the other member having a zero marking on the periphery thereof for registry with said scale, said rotatable ring-shaped member adapted to be manually held stationary while the lathe stop is threadedly indexed.

3. An indicator for micrometer adjustment of a screw threaded lathe stop comprising an annularly-shaped head fixed to the outer end of the lathe stop and having a scale on the outer periphery thereof extending therearound, an outwardly projecting circular flange fixed on the outer end of the lathe stop in axial spaced relation to the head, the peripheral surface area between the head and the flange being smooth and forming a journal mounting, and a ring journaled for free turning on said smooth surface area and retained by the head and flange from axial movement relative to the lathe stop, the outer peripheral surface of the ring extending flush with the outer periphery of the head and provided with a zero marking for registry with said scale.

MARVIN L. PARKER.

REFERENCES CITED

The following references are of record in the file of this patent:

UNITED STATES PATENTS

| Number | Name | Date |
| --- | --- | --- |
| 1,269,756 | Slocomb | June 18, 1918 |
| 1,459,917 | McCann | June 26, 1923 |
| 2,009,519 | Reed | July 30, 1935 |
| 2,104,520 | Jackson et al. | Jan. 4, 1938 |
| 2,104,521 | Jackson et al. | Jan. 4, 1938 |
| 2,107,222 | Summers | Feb. 1, 1938 |

FOREIGN PATENTS

| Number | Country | Date |
| --- | --- | --- |
| 522,779 | Great Britain | Apr. 23, 1943 |